United States Patent Office
3,442,930
Patented May 6, 1969

3,442,930
ALDEHYDE-ESTER COMPOUNDS
Wayne V. McConnell and William H. Moore, Kingsport, Tenn., assignors to Eastman Kodak Company, Rochester, N.Y., a corporation of New Jersey
No Drawing. Filed Sept. 8, 1964, Ser. No. 395,028
Int. Cl. C07c 69/76, 69/74, 69/66
U.S. Cl. 260—468    4 Claims

ABSTRACT OF THE DISCLOSURE

Compounds containing both an aldehyde and an ester group are prepared by isomerization of certain epoxy ester groups in the presence of an acid catalyst. The aldehyde esters are valuable intermediates for the preparation of certain diol compounds which are useful, for example, as plasticizers.

---

This invention relates to novel chemical compounds and to their preparation. More particularly it relates to novel compounds containing both an aldehyde and an ester group and to a novel process for preparing them.

The novel aldehyde-ester compounds of the invention have the formula:

(I)
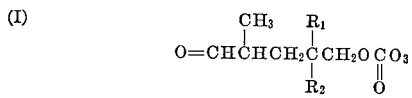

wherein $R_1$ represents hydrogen or alkyl, $R_2$ represents alkyl and $R_3$ represents alkyl, cycloalkyl or a monocyclic aryl nucleus.

In accordance with the novel process of the invention the new aldehyde-ester compounds are prepared by isomerization of the epoxy-ester compounds having the formula:

(II)
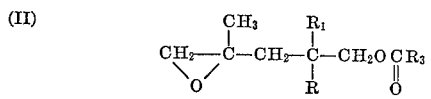

wherein $R_1$, $R_2$ and $R_3$ have the meaning previously assigned to them, in the presence of an acid catalyst. Excellent yields of the novel aldehyde-ester compounds of the invention can be obtained using the novel process of the invention.

The process of the invention advantageously is carried out in the presence of a strong acid catalyst. Such catalysts are well known to the art and include, for example, sulfuric acid, phosphoric acid, p-toluenesulfonic acid, alkanemonosulfonic acids such as methanesulfonic acid, ethanesulfonic acid, alkanedisulfonic acids such as methanedisulfonic acid, 1,2-ethanedisulfonic and 1,2-propanedisulfonic acid, boron fluoride and acidic ion exchange resins such as the polystyrene sulfonic acid type. The strong acid catalysts named are intended to be illustrative and not limitative of those that can be employed.

Diluents are not required in carrying out the process of the invention but were usually employed. The diluent employed should be inert with respect to the reaction taking place. Aliphatic hydrocarbons such as heptane, isooctane and petroleum naphtha, alicyclic hydrocarbons such as cyclohexane, cycloheptane and cyclopentane, aromatic hydrocarbons such as benzene, toluene and xylene, ethers such as dioxane, di-n-butyl ether and di-isopropyl ether, chlorinated hydrocarbons such as chloroform and tetrachloroethane acetonitrile and an ester such as ethyl acetate are illustrative, but not limitative, of the diluents that can be employed.

Temperatures ranging from 10° C. to 150° C. were employed, depending on the diluent (solvent) and catalyst used, in carrying out the process of the invention. For example, inert solvents such as benzene, toluene and xylene were employed over the entire temperature range stated using boron fluoride as the catalyst. Normally the corresponding ester of tetrahydro-2,4,4-trimethyl-furfuryl alcohol is obtained as a co-product in carrying out the process of the invention. At lower temperatures (using the solvents and catalyst just mentioned), the yield of the aldehyde-ester compound obtained was considerably less than that of the tetrahydrofurfuryl ester compound. At higher temperatures (e.g. reflux) the yield of the aldehyde-ester compound obtained was greatly increased.

Temperature, solvent and catalyst all affect the course of the isomerization process of the invention. When boron fluoride was employed as the catalyst solvent effect was pronounced. Those solvents, such as dimethyl sulfoxide, for example, in which the electrophilic character of boron fluoride was reduced promoted the formation of the aldehyde-ester compound over that of the tetrahydrofurfuryl ester compound. When boron fluoride was employed in dimethyl sulfoxide, for example, the major product was the aldehyde-ester; the only other product obtained was a cyclic acetal, dimeric to the aldehyde-ester. This cyclic acetal on acid hydrolysis yielded a substantial amount of the aldehyde-ester as well as a smaller amount of the corresponding tetrahydrofurfuryl ester.

When a strong mineral acid such as sulfuric acid or phosphoric acid, for example, is employed as the catalyst the reaction goes to completion quickly at room temperature, 20° C.–30° C.

The 4,5-epoxyalkyl ester compounds having the Formula II can be prepared by epoxidation of the corresponding 4-penten-1-yl ester compounds according to the procedure described in a paper by us entitled "A Novel Rearrangement of Epoxyalkyl Esters," J. Org. Chem., 28, 822–829 (1963). This paper describes the preparation of 4,5-epoxy-2,2,4-trimethylpentyl isobutyrate. The other 4,5-epoxyalkyl ester compounds can be similarly prepared. The preparation of the substituted 4-methylpentenal compounds from which the 4-penten-1-yl ester compounds are derived is taught by K. C. Brannock in J.A.C.S., 81, 3379 (1959).

While the novel process of the invention has been described with reference to the use of strong acid catalysts any acid catalyst which will effectuate acid catalysis can be employed.

The following examples illustrate the invention.

EXAMPLE 1

A solution of 4,5-epoxy-2,2,4-trimethylpentyl isobutyrate (50 g.) in dimethyl sulfoxide (50 ml.) was added to a stirred solution of boron trifluoride etherate (5 g.) in dimethyl sulfoxide (50 ml.) during 15 min. There was a slight temperature rise, and the temperature was maintained at 25–30° C. during the reaction. After 6 hrs., the reaction was complete. The reaction mixture was poured into water (450 ml.) containing sodium acetate (5 g.) and sodium chloride (25 g.). The oily layer which separated was dried over magnesium sulfate, then distilled under reduced pressure. 31.9 g. (58%) of 5-oxo-2,2,4-trimethylpentyl isobutyrate were obtained in a fraction boiling at 82–84° C. (0.8 mm.). The residue was a viscous liquid containing as its major constituent a cyclic acetal, which was a dimer of the starting epoxyalkyl ester. This cyclic acetal can be converted largely to the desired aldehyde-ester compound by heating in the presence of boron fluoride as in Example 10.

EXAMPLE 2

A solution of 4,5-epoxy-2,2,4-trimethylpentyl isobutyrate (50 g.) in ethyl acetate (150 ml.) was added over a 20 min. period to a 5% (w./v.) solution (50 ml.)

of boron fluoride in ethyl acetate while maintaining a temperature of about 35° C. The reaction was complete after the epoxy ester had been added. The reaction mixture was then washed successively with sodium acetate solution and with water. After distillation of the organic layer, 26 g. of 5-oxo-2,2,4-trimethylpentyl isobutyrate were obtained as the fraction boiling at 79–83° C. (0.8 mm.). Tetrahydro-2,4,4-trimethylfurfuryl isobutyrate (21 g.) was the major by-product; B.P. 67–70° C. (0.8 mm.).

EXAMPLE 3

Example 2 was repeated except benzene was used instead of ethyl acetate as the solvent, and the reaction temperature employed was 10° C. The products were 5-oxo-2,2,4-trimethylpentyl isobutyrate (11 g.) and tetrahydro-2,4,4-trimethylfurfuryl isobutyrate (33 g.).

EXAMPLE 4

The procedure used in Example 3 was followed except a reaction temperature of 75° C. was used. 5-oxo-2,2,4-trimethylpentyl isobutyrate (23 g.) and tetrahydro-2,4,4-trimethylfurfuryl isobutyrate (23 g.) were obtained as the products.

EXAMPLE 5

A procedure corresponding to that used in Example 2 was employed for the isomerization, except toluene was used as the solvent and the reaction temperature was about 110° C. The reaction products included 5-oxo-2,2,4-trimethylpentyl isobutyrate (25 g.) and tetrahydro-2,4,4-trimethylfurfuryl isobutyrate (22 g.).

EXAMPLE 6

A cyclohexane (150 ml.) solution of 4,5-epoxy-2,2,4-trimethylpentyl isobutyrate (150 g.) was added concurrently with 15 g. of 50% sulfuric acid to a flask containing 150 ml. of cyclohexane. The reaction mixture was stirred and maintained at 20–30° C. while adding the epoxy ester and the catalyst solutions over a 15 min. period. None of the 4,5-epoxy ester starting material remained after the addition of the solutions had been completed. The organic layer was separated and washed successively with sodium bicarbonate solution and water. Upon distillation 51 grams (34%) of 5-oxo-2,2,4-trimethylpentyl isobutyrate were obtained as the fraction boiling at 81–85° C. (0.7 mm.). The residue which remained was subjected to molecular distillation which gave a 72 g. fraction of the dimeric cyclic acetal referred to in Example 1.

EXAMPLE 7

The procedure described in Example 6 was followed except dioxane was used as the solvent in the 4,5-epoxy-2,2,4-trimethylpentyl isobutyrate starting solution and 80% aqueous dioxane was employed for the sulfuric acid solution. The reaction was complete immediately after the mixing of the epoxy ester with the catalyst solution. 47 g. of 5-oxo-2,2,4-trimethylpentyl isobutyrate were obtained.

EXAMPLE 8

A solution of 4,5-epoxy-2,2,4-trimethylpentyl isobutyrate 50 g.) in cyclohexane (125 g.) was added over a period of 15 min. to a mixture of p-toluenesulfonic acid (2.5 g.) in cyclohexane (75 g.) heated to reflux. The mixture was stirred and refluxed for 30 min. after the addition of the epoxy ester. After working up in the usual manner, 21 g. of 5-oxo-2,2,4-trimethylpentyl isobutyrate were obtained in the fraction distilling at 78–83° C. (1.0 mm.).

EXAMPLE 9

Example 8 was repeated except 5 g. of a polystyrenesulfonic acid-type ion exchange resin (Dow Catalyst 410) was used as the catalyst. The mixture was stirred and refluxed for 5 hrs. The catalyst was removed by filtration and the residue fractionated to yield 24 g. of 5-oxo-2,2,4-trimethylpentyl isobutyrate and 16 g. of tetrahydro-2,4,4-trimethylfurfuryl isobutyrate.

EXAMPLE 10

A solution containing 5 g. of the cyclic acetal obtained as described in Example 1 in benzene (15 ml.) was added to 5 ml. of a 5% solution of boron fluoride in benzene. The mixture was stirred and heated on a steam bath for 30 min. The reaction mixture was washed with a dilute sodium acetate solution, dried, and the benzene evaporated. The product consisted chiefly of 5-oxo-2,2,4-trimethylpentyl isobutyrate along with a small amount of tetrahydro-2,4,4-trimethylfurfuryl isobutyrate.

EXAMPLE 11

4,5-epoxy-2,2,4-trimethylpentyl acetate was isomerized to 5-oxo-2,2,4-trimethylpentyl acetate using a procedure similar to that described in Example 4.

EXAMPLE 12

4,5-epoxy-2,2,4-trimethylbenzoate was isomerized to 5-oxo-2,2,4-trimethylpentylbenzoate using the procedure of Example 6.

EXAMPLE 13

Using the procedure of Example 6, 4,5-epoxy-2,2,4-tri methylpentyl cyclohexanecarboxylate was isomerized to 5-oxo-2,2,4-trimethylpentyl cyclohexanecarboxylate.

EXAMPLE 14

When 4,5-epoxy-2-ethyl-4-methylpentyl acetate is treated under the conditions described in Example 6, for example, it isomerizes to 5-oxo-2-ethyl-4-methylpentyl acetate.

EXAMPLE 15

4,5-epoxy-2-butyl-2-ethyl-4-methylpentyl acetate was isomerized to 5-oxo-2-butyl-2-ethyl-4-methylpentyl acetate under the conditions disclosed in Example 6.

When $R_1$ is alkyl it can have 1 to 6 carbon atoms. $R_2$ is methyl or ethyl. When $R_3$ is alkyl it can have 1 to 17 carbon atoms. Ordinarily, when $R_3$ is alkyl the alkyl radical has 1 to 3 carbon atoms.

The compounds tabulated hereinafter further illustrate the new compounds of the invention.

TABLE I 5-oxo-2-ethyl-2,4-dimethylpentyl isobutyrate
5-oxo-2-propyl-2,4-dimethylpentyl isobutyrate
5-oxo-2-isopropyl-2,4-dimethylpentyl isobutyrate
5-oxo-2-butyl-2,4-dimethylpentyl isobutyrate
5-oxo-2-pentyl-2,4-dimethylpentyl isobutyrate
5-oxo-2-hexyl-2,4-dimethylpentyl isobutyrate
5-oxo-2,2-diethyl-4-methylpentyl isobutyrate
5-oxo-2-ethyl-2-butyl-4-methylpentyl acetate
5-oxo-2-ethyl-2-hexyl-4-methylpentyl propionate
5-oxo-2,2,4-trimethylpentyl propionate
5-oxo-2,2,4-trimethylpentyl butyrate
5-oxo-2,2,4-trimethylpentyl valerate
5-oxo-2,2,4-trimethylpentyl caproate
5-oxo-2,2,4-trimethylpentyl caprylate
5-oxo-2,2,4-trimethylpentyl caprate
5-oxo-2,2,4-trimethylpentyl laurate
5-oxo-2,2,4-trimethylpentyl palmitate
5-oxo-2,2,4-trimethylpentyl stearate
5-oxo-2-ethyl-4-methylpentyl isobutyrate
5-oxo-2-propyl-4-methylpentyl acetate
5-oxo-2-butyl-4-methylpentyl acetate
5-oxo-2-pentyl-4-methylpentyl acetate
5-oxo-2-hexyl-4-methylpentyl isobutyrate It is to be clearly understood that other ester forms of the foregoing compounds can be prepared. To illustrate, the benzoate or cyclohexane-carboxylate ester from, for example, can be prepared.

The new compounds of our invention are valuable intermediates for the preparation of 1,5-pentanediol compounds having the formula:

(III)
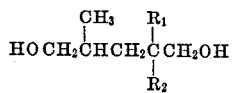

and 1,5-pentanediol monoester compounds having the formula:

(IV)
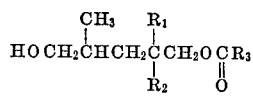

$R_1$, $R_2$ and $R_3$ in Formulas III and IV have the meaning previously assigned to them.

The compounds having the Formula IV are prepared by reduction of the aldehyde-ester compounds having the Formula I. The reduction can be carried out, for example, with hydrogen, under pressure, in the presence of Raney nickel catalyst or chemically with sodium borohydride. The compounds having the Formula III are prepared by saponification of the compounds having the Formula IV. These processes are illustrated hereinafter.

EXAMPLE 16

A solution of 5-oxo-2,2,4-trimethylpentyl isobutyrate (64 parts) in ethanol (100 parts) was hydrogenated for 3 hrs. at 90° C., 1500 p.s.i. hydrogen pressure in the presence of Raney nickel catalyst (4 parts). After filtering the catalyst, the product was distilled to give 2,2,4-trimethyl-1,5-pentanediol 1-isobutyrate (53 parts) in the fraction distilling at 91-94° C. (1 mm.).

EXAMPLE 17

5-oxo-2,2,4-trimethylpentyl isobutyrate (200 parts) was hydrogenated using Raney nickel catalyst (10 parts) under the conditions described in Example 16. The conversion to 2,2,4-trimethyl-1,5-pentanediol 1-isobutyrate was 78%.

EXAMPLE 18

To a stirred mixture of 5-oxo-2,2,4-trimethylpentyl isobutyrate (33 parts) in 100 parts of aqueous ethanol (75% ethanol), sodium borohydride (2.3 parts) was added portionwise. The temperature was maintained at 25-30° C. during the addition of the borohydride and for 0.5 hr. thereafter, using external cooling as needed. The mixture was neutralized (to pH 7.0-7.5) with 6 N hydrochloric acid, and most of the ethanol was distilled using reduced pressure and a base temperature below 60° C. The organic layer was separated, washed with 10% aqueous sodium chloride solution (30 parts) and then distilled. The fraction (26 parts) distilling at 93-96° C. (1.5 mm.) was the desired 2,2,4-trimethyl-1,5-pentanediol 1-isobutyrate.

EXAMPLE 19

The saponification of 2,2,4-trimethyl-1,5-pentanediol 1-isobutyrate was effected by refluxing a mixture of this ester (150 parts) and sodium hydroxide (40 parts) in a 50% aqueous methanol solution (400 parts). After 30 min. refluxing the mixture was neutralized with sulfuric acid and the solvents were distilled off. The residue was extracted with chloroform (150 parts) and the chloroform solution washed once with 20% sodium chloride solution. The organic layer was distilled giving 88 parts of 2,2,4-trimethyl-1,5-pentanediol; B.P. 92-99° C. (1.5 mm.).

The diol compounds having the Formula III are useful in the preparation of polyester compositions. When included as one of the reactants used to prepare modified poly(ethylene terephthalate) compositions, for example, the melting point of the polyester compositions can be effectively varied. The diol compounds lower the melting point of the polyester compositions. The mono- and di-esters of these diols are excellent plasticizers for poly(vinyl chloride) resins and plastisols. The monoesters have the Formula IV. These monoester compounds can be converted to diester compounds by known esterification procedures. The diester compounds can also be prepared from the diol compounds having the Formula IV.

We claim:
1. A compound having the formula:

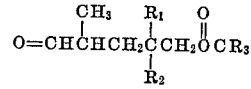

wherein $R_1$ represents a member selected from the group consisting of hydrogen or an alkyl radical having 1-6 carbon atoms, $R_2$ is methyl or ethyl and $R_3$ is cyclohexyl.

2. A compound having the formula:

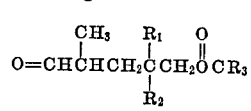

wherein $R_1$ represents a member selected from the group consisting of hydrogen or an alkyl radical having 1-6 carbon atoms, $R_2$ is methyl or ethyl and $R_3$ is a phenyl nucleus.

3. 5-oxo-2,2,4-trimethylpentyl benzoate.
4. 5-oxo-2,2,4-trimethylpentyl cyclohexanecarboxylate.

References Cited

Parker et al., Chem. Rev., vol. 59 (1959), pp. 772-775.

McConnell et al., J. Org. Chem., vol. 28 (1963), pp. 822-827.

LORRAINE A. WEINBERGER, *Primary Examiner.*

P. J. KILLOS, *Assistant Examiner.*

U.S. Cl. X.R.

260—31.6, 347.4, 348, 410.9, 476, 488, 491, 635